UNITED STATES PATENT OFFICE.

LORENZ ACH, OF MANNHEIM, GERMANY, ASSIGNOR TO C. F. BOEHRINGER & SOEHNE, OF MANNHEIM, GERMANY, A FIRM.

PROCESS OF MAKING CAMPHOR.

No. 802,793.   Specification of Letters Patent.   Patented Oct. 24, 1905.

Application filed June 28, 1905. Serial No. 267,447.

*To all whom it may concern:*

Be it known that I, LORENZ ACH, a citizen of the German Empire, residing at Mannheim, Germany, have invented certain new and useful Improvements in the Preparation of Camphor from Borneols; and I do hereby declare the following to be a full, clear, and exact description of the invention, such as will enable others skilled in the art to which it appertains to make and use the same.

On passing so-called "gaseous nitrous acid" over isoborneol the former is rapidly absorbed, whereby heat is liberated and the isoborneol, the surface of which soon becomes moist, gradually deliquesces. A mobile liquid is formed, which gradually becomes clouded by separation of water. On saturating the well-cooled liquid with the gas until a bluish-green coloration is attained and letting the liquid stand for a time a rise of temperature takes place and nitrous fumes are evolved, (which turn brown on coming in contact with the atmosphere.) The product thus obtained consists of two liquid layers, of which the upper is a clear slightly-colored oil, the lower one consisting of a comparatively small quantity of aqueous fluid. The oil possesses the property of solidifying to a mass of crystalline camphor on mixing with water. The same reaction takes place when nitrous gases are passed over borneol. On this property of the two borneols is founded my process for the preparation of camphor from these materials. The advantage of my process consists in the fact that hereby a good yield of camphor is attained, the same being pure and free from by-products. The amount of nitrous acid consumed during the process is comparatively small, inasmuch as the gases which escape from the liquid react with the atmospheric oxygen, regenerating nitrous acid, which may be reintroduced into the process. Instead of solid borneols I can use in carrying out my invention a suitable solution of the same, employing as solvents—*e. g.*, chloroform, ligroine, ether.

The oxidation of borneol and isoborneol to camphor by means of nitric acid is known, but has the disadvantage of giving poor yields, because the camphor formed suffers further oxidation. My process, on the contrary, leads, as already mentioned, to a quantitative yield of camphor.

The following examples will serve to illustrate the best mode of carrying out my invention.

*Example 1—Preparation of camphor from isoborneol and nitrous gases.*—In an enameled vessel, which is furnished with a stirring arrangement and a cooling apparatus, ten kilograms of isoborneol are subjected to the action of well-dried nitrous gases which are passed in by a tube. The escaping fumes are compelled to pass through a reflux condenser. As soon as all the borneol is liquefied the vessel is cooled from outside with water, and the introduction of gas is continued until the liquid has attained a bluish-green coloration. The mixture is now allowed to stand, care being taken to prevent the temperature rising above 60° to 70° centigrade. During this time nitrous fumes are evolved. After about four or five hours the contents of the vessel are allowed to pour slowly into one hundred liters of water, whereupon the camphor at once separates in the pure state.

*Example 2—Preparation of camphor from borneol and nitrous gases.*—Instead of isoborneol ten kilograms of borneol are introduced into the vessel and the whole process is carried out in the same manner as described in Example 1.

*Example 3—Preparation of camphor from an ethereal solution of isoborneol and nitrous gases.*—A solution of ten kilograms of isoborneol in eight kilograms of ether are introduced into a vessel furnished with a reflux condenser, and so-called "gaseous nitrous acid" slowly passed in. After a short time the ether begins to boil. The nitrous gases are passed in until a fall of temperature takes place, which indicates the end of the reaction. Thereupon the ethereal solution is agitated first with water, then with an aqueous alkali solution. On evaporating the ether, camphor remains as a crystalline mass.

What I claim, and wish to secure by Letters Patent of the United States, is—

1. The process of preparing camphor by the action of nitrous gases on borneols.

2. The process of preparing camphor by passing nitrous gases over isoborneol.

3. The process of preparing camphor by passing nitrous gases over isoborneol, saturating the liquid hereby formed with the gas, and cooling.

4. The process of preparing camphor by passing nitrous gases over isoborneol, saturating the liquid hereby formed with the gas and cooling, and allowing the whole to stand for several hours.

5. The process of preparing camphor by passing nitrous gases over isoborneol, saturating the liquid hereby formed with the gas and cooling, allowing the whole to stand for several hours, thereupon pouring the product of reaction into water.

6. The process of preparing camphor by passing nitrous gases into a solution of isoborneol saturating the liquid with the gas, cooling, allowing to stand for several hours, agitating the solution with water and with an aqueous alkali solution and thereupon evaporating the solvent.

In testimony whereof I hereunto affix my signature in the presence of two witnesses.

LORENZ ACH.

Witnesses:
BENNO ACH,
JOSEPH H. LEUTE.